July 28, 1942. J. H. BALCH 2,291,568
TUBE COVERING AND METHOD OF MAKING
Filed Oct. 29, 1941
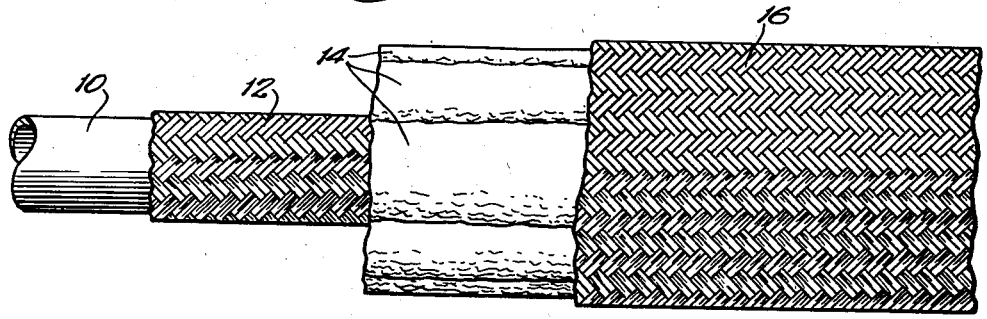
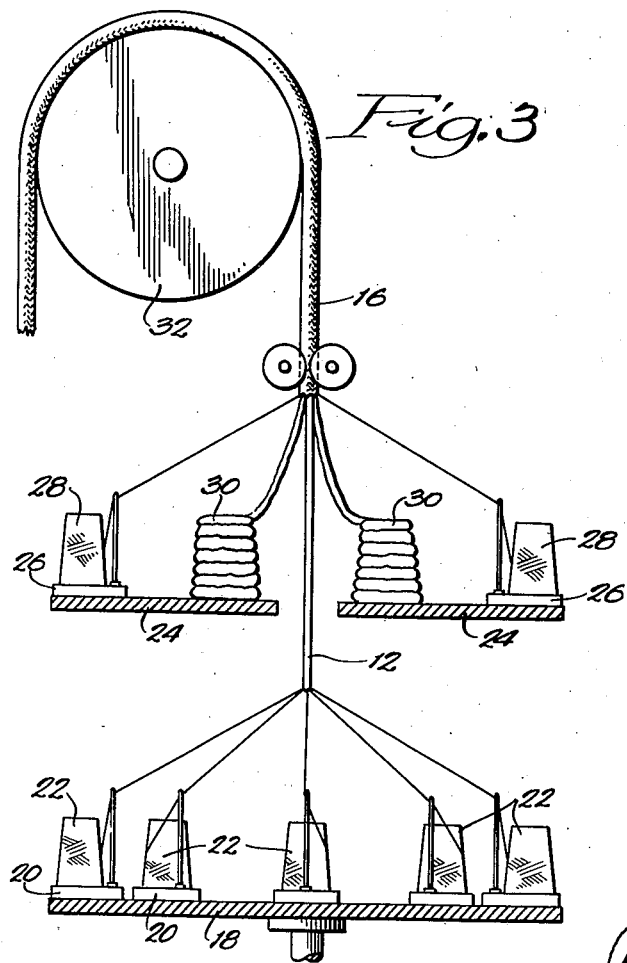
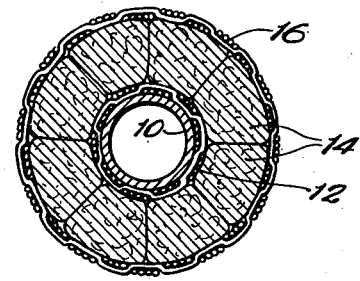
Inventor:
John H. Balch,
By Dawson, Ooms & Booth,
Attorneys.

Patented July 28, 1942

2,291,568

UNITED STATES PATENT OFFICE 2,291,568

TUBE COVERING AND METHOD OF MAKING

John H. Balch, Evanston, Ill., assignor to Union Asbestos & Rubber Company, Chicago, Ill., a corporation of Illinois Application October 29, 1941, Serial No. 417,007

8 Claims. (Cl. 96—26)

This invention relates to tube coverings and method of making, and more particularly to the manufacture of insulating covers for fluid lines and the like.

Heretofore, fluid lines requiring insulation have generally been wrapped with an insulating tape which is wound spirally around the lines. In this method of covering, application of the covering to the tubes or lines is slow, and it is difficult to obtain good joints between adjacent edges of the covering tape. It is, furthermore, difficult to obtain a uniform tight grip between the covering and the tube, so that the covering will not bunch or shake loose upon vibration.

The present invention has for one of its objects the provision of a tube covering which may be applied quickly and easily, and which will form a uniform tight covering over the tube.

Another object of the invention is to provide a tube covering which expands its diameter when shortened, and decreases its diameter when stretched. Due to this characteristic, the covering may be pushed over the tube easily, and when stretched over the tube, will grip it tightly and uniformly throughout its length, and will provide a covering of uniform inside and outside diameter throughout.

Still another object of the invention is to provide a method of making tube coverings which is simple and fast, and according to which any desired length of covering can be made.

The above and other objects and advantages of the invention will be apparent from the following description when read in connection with the accompanying drawing, in which:

Figure 1 is a side elevation of a tube covered according to the present invention, with successive layers broken away;

Figure 2 is a section at right angles to Figure 1; and

Figure 3 is a diagrammatic view illustrating the method of manufacturing the tube covering.

In Figure 1 there is shown a pipe or tube 10 to be covered, and which may be a fuel line or heater conduit on an aircraft, or any other desired fluid conduit requiring insulation. Over the tube 10 there is fitted an inner flexible sleeve 12, formed by a plurality of flexible strands braided together in a tubular braid. Preferably, the strands are of asbestos cord, and are braided in pairs, as shown, with each pair passing alternately over and then under two successive pairs in the braid. For braids of larger diameter, more than two cords may be laid together and braided, while for small diameter coverings the cords may be braided singly. I prefer to employ two or more cords laid together in the braid, in order to provide a relatively smooth inner surface on the sleeve, so that it will slip readily over the tube.

Around the inner sleeve 12 there is arranged an annular body of loose packing material, shown as formed by a plurality of asbestos rovings 14, extending longitudinally of the covering in annular array. The packing material is held in place and the covering is completed by an outer sleeve 16, formed by a tubular braid of asbestos cords similar to the inner sleeve 12.

In applying the covering to a tube, the completed covering is forced over the tube so that it tends to shorten its length, resulting in an increase in the diameters of the inner and outer sleeves. The covering may then be slid easily over the tube, it having been found in practice that as much as forty or fifty feet of covering can easily be slid on to a tube in this manner. After the covering is in place, it may be stretched longitudinally to decrease the diameters of the sleeves so that the inner sleeve 12 will grip the tube tightly and evenly throughout its length. Because of the fact that the covering is perfectly uniform throughout and grips the tube evenly throughout, any tendency toward bunching or slipping under vibration is eliminated.

The covering may be formed on a machine similar to that shown diagrammatically in Figure 3. In this figure, a lower table 18 supports a plurality of bobbins 20, which ride around in tracks in the table, and which carry spools 22 of asbestos cord or the like. As the bobbins ride around during operation of the machine, the cords are braided together to form the tubular braided sleeve 12. The sleeve 12 passes vertically through a central opening in an upper table 24, similarly carrying a plurality of bobbins 26, having spools 28 of asbestos cord thereon. Inwardly of the bobbins, the table 24 supports a plurality of coils 30 of asbestos rovings. As the bobbins 26 are moved in the track on the table 24, the outer sleeve 16 is formed over the inner sleeve 12, the rovings 30 being fed between the two sleeves by the frictional grip of the sleeves thereon. The completed covering is drawn off over a wheel 32, and may be cut off in any desired lengths.

By this method of manufacture, it will be seen that the covering can be made in any desired lengths, or in a continuous length, if preferred. To accomplish this, the spools 22 and 28 of asbestos cord are replaced as they run out, the end of each new cord being tied to the end of the last cord. Similarly, the coils of rovings may be replaced, the end of a new roving simply being tucked in place between the inner and outer sleeves, so that it will be gripped thereby and fed during operation of the machine.

While one embodiment of the invention has been shown and described in detail, it will be understood that this is illustrative only and is not to be taken as a definition of the scope of the invention, reference being had for this purpose to the appended claims.

What is claimed is:

1. A tube covering comprising an inner flexible tubular sheath adapted to fit over a tube or the like to be covered, an outer flexible tubular sheath coaxial with and of larger diameter than the inner sheath, and a loose body of packing material between the sheaths.

2. A tube covering comprising an inner flexible tubular sheath adapted to fit over a tube or the like to be covered, an outer flexible tubular sheath coaxial with and of larger diameter than the inner sheath, and a plurality of asbestos rovings in annular array between the sheaths.

3. A tube covering comprising an inner flexible tubular sheath which is longitudinally yieldable and so constructed and arranged as to change its diameter on a change in length, an outer flexible tubular sheath longitudinally yieldable and coaxial with and of larger diameter than the inner sheath, and an annular body of packing material between the sheaths, the inner sheath adapted to slip over a tube or the like and to grip the tube when it is stretched thereon.

4. A tube covering comprising an inner sheath formed by a plurality of elongated flexible strands braided together in a tubular braid, an annular body of yielding packing material around said sheath, and an outer flexible sheath around the packing material.

5. A tube covering comprising an inner sheath formed by a plurality of elongated flexible strands braided together in a tubular braid, an annular body of yielding packing material around said sheath, and an outer flexible sheath around the packing material, the outer sheath being formed by a plurality of elongated flexible strands braided together in a tubular braid.

6. A tube covering comprising an inner sheath formed by a plurality of asbestos cords braided together in a tubular braid, a plurality of asbestos rovings in annular array around the inner sheath, and an outer sheath around the rovings and the inner sheath, the outer sheath being formed by a plurality of asbestos cords braided together in a tubular braid.

7. The method of making tube coverings comprising forming a hollow tubular braid of flexible strands, feeding the braid longitudinally, feeding a plurality of relatively large strands of packing material in annular array around the braid, and braiding a plurality of flexible strands in an annular braid around the rovings.

8. The method of making tube coverings comprising forming a hollow tubular braid of asbestos cords, feeding the braids longitudinally, feeding a plurality of asbestos rovings in annular array around the braid, and braiding a plurality of asbestos cords in an annular braid around the rovings.

JOHN H. BALCH.